Figure 1:
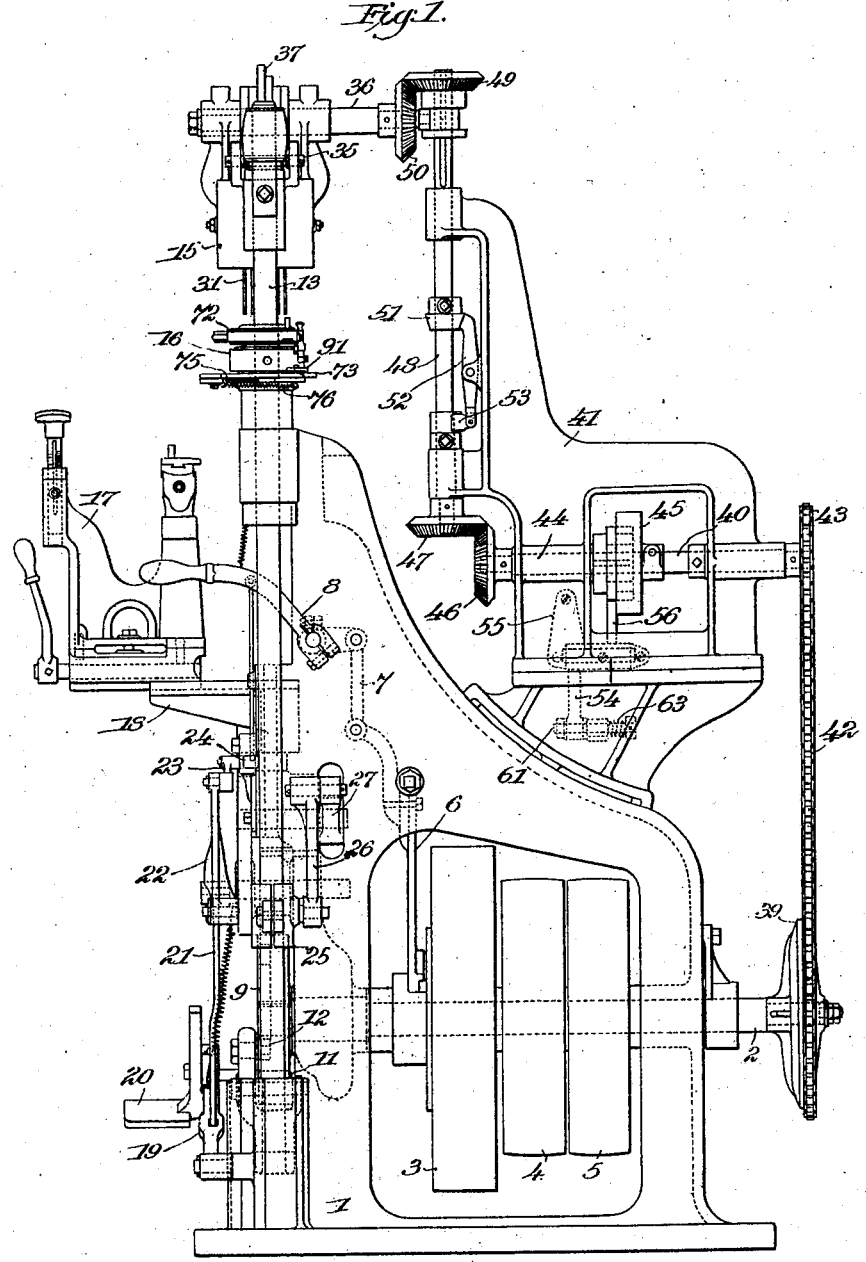

No. 750,047. PATENTED JAN. 19, 1904.
H. BRIGGS.
HEELING MACHINE.
APPLICATION FILED MAR. 28, 1902.
NO MODEL. 7 SHEETS—SHEET 1.

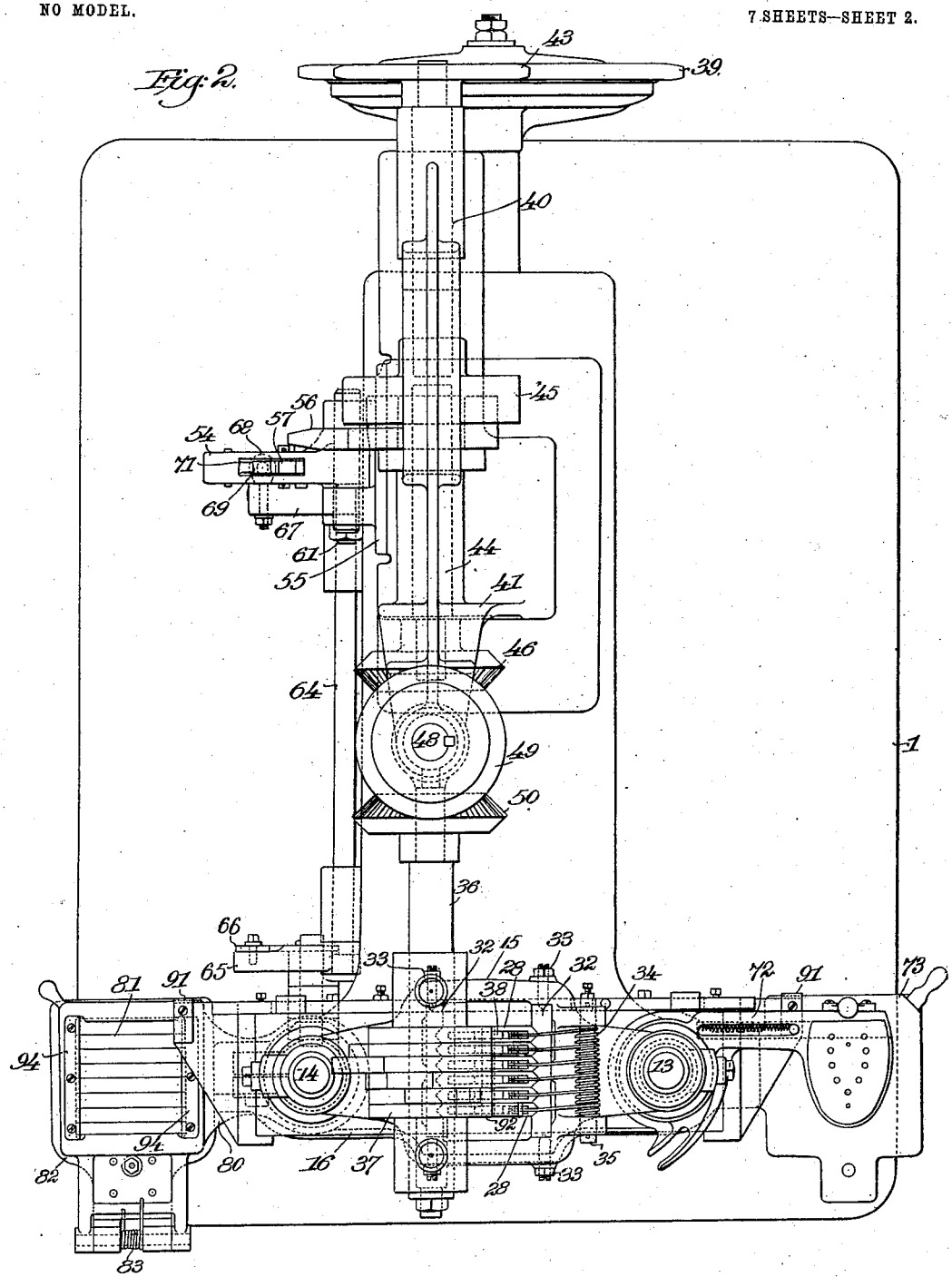

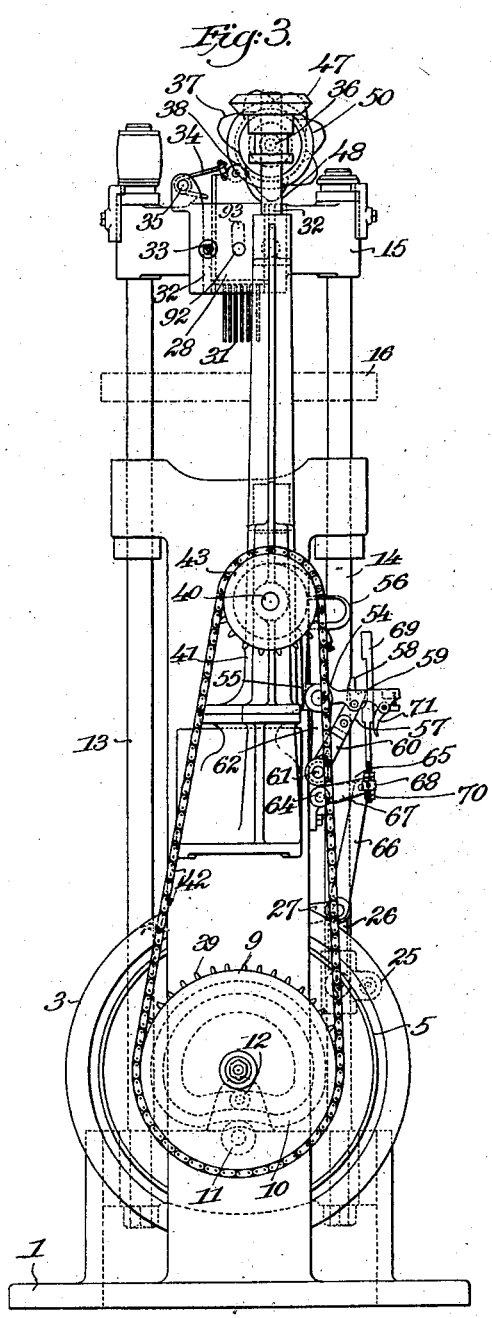

No. 750,047. PATENTED JAN. 19, 1904.
H. BRIGGS.
HEELING MACHINE.
APPLICATION FILED MAR. 28, 1902.
NO MODEL. 7 SHEETS—SHEET 4.
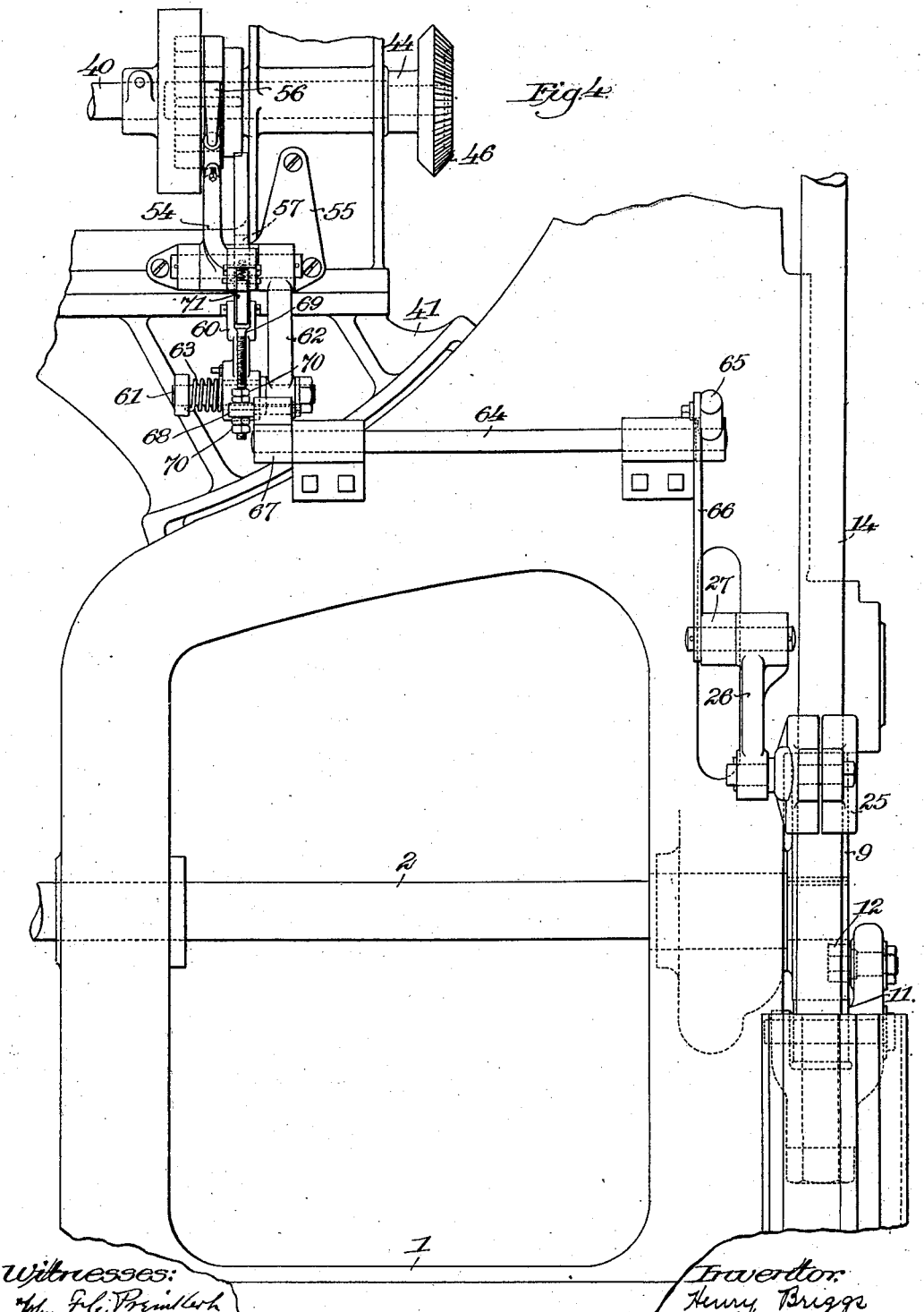

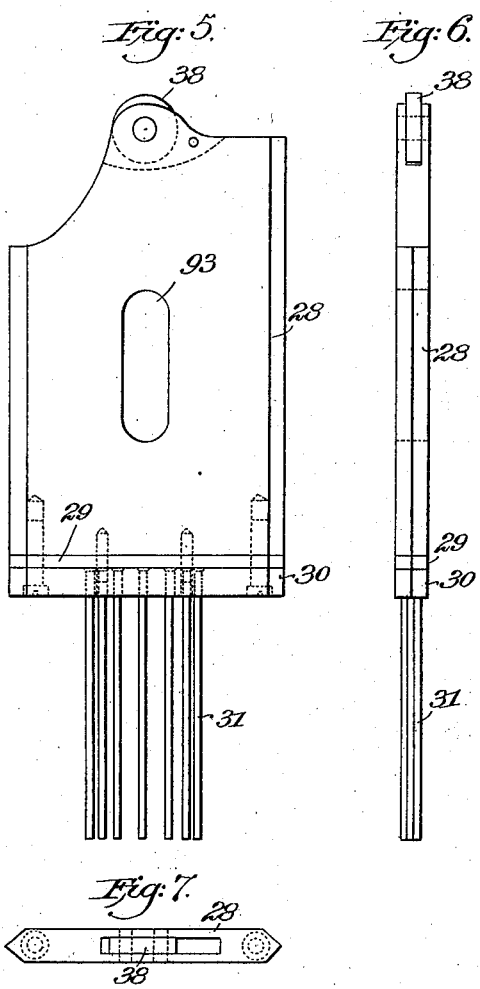

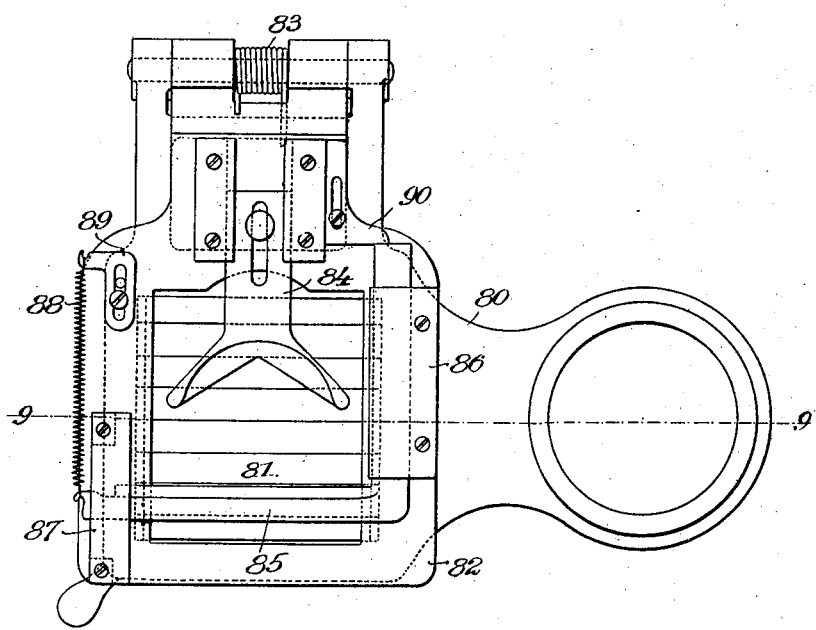

No. 750,047. PATENTED JAN. 19, 1904.
H. BRIGGS.
HEELING MACHINE.
APPLICATION FILED MAR. 28, 1902.
NO MODEL. 7 SHEETS—SHEET 7.

No. 750,047. Patented January 19, 1904.

UNITED STATES PATENT OFFICE.

HENRY BRIGGS, OF HASBROUCK HEIGHTS, NEW JERSEY.

HEELING-MACHINE.

SPECIFICATION forming part of Letters Patent No. 750,047, dated January 19, 1904.

Application filed March 28, 1902. Serial No. 100,443. (No model.)

*To all whom it may concern:*

Be it known that I, HENRY BRIGGS, a citizen of the United States, residing at Hasbrouck Heights, in the county of Bergen and State of New Jersey, have invented certain new and useful Improvements in Heeling-Machines; and I do hereby declare the following to be a full, clear, and exact description of the invention, such as will enable others skilled in the art to which it appertains to make and use the same.

The present invention relates to heel-nailing machines.

In heel-nailing machines as now usually constructed all of the heel-attaching nails are driven simultaneously, and in such machines having provision for pressing or, as generally termed in the art, for "spanking" a top lift upon the projecting ends of the nails in order to produce a blind nailed heel the top lift is pressed or spanked upon all of the nails simultaneously. The heavy pressure necessary to perfom these operations properly, on account of the resistance offered to the nails by the clenching-plate, by which the nails are clenched on the inside of the shoe, and on account of the resistance offered to the top lift by the heads of the nails, subjects the various parts of the machine, and especially those parts which support the shoe, to severe strains, tending to break or otherwise injure them. This is objectionable in all heel-nailing machines, but especially so in machines designed to operate upon shoes while on the last, as the wooden lasts, which are universally employed, are not able to stand the strain to which they are subjected and soon become crushed and broken.

In order to reduce the pressure exerted during the nail-driving operation, it has been proposed to provide means for driving the heel-attaching nails successively either singly or in groups. Machines constructed to operate in this manner have, however, proved unsatisfactory and impractical, since the driving mechanism is arranged to drive the heel-attaching nails in regular order around the heel, all the nails on one side of the heel being driven before any of the nails on the other side are driven, this mode of operation resulting in displacing the heel upon the shoe and also in preventing the side of the heel which is last nailed from being pressed down snugly against the sole of the shoe.

So far as I am advised as to the state of the art no attempt has been made to reduce the pressure required to spank the top lift upon the projecting ends of the heel-attaching nails.

The object of the present invention is to produce a practically operative heel-nailing machine by which the heel-attaching nails can be driven without the use of a heavy pressure sufficient to subject the various parts of the machine to strain liable to break the same or sufficient to crush or break the wooden last when such last is used to support the shoe.

Another object of my invention is to provide a heel-nailing machine with means for pressing or spanking a top lift upon the projecting ends of the nails without the use of the heavy pressure which has heretofore been required for performing this operation, and thereby relieve the various parts of the machine from the injurious strains to which they have heretofore been subjected and enable the machine to act satisfactorily upon shoes supported upon wooden lasts.

Other objects of my invention are to generally improve the construction, organization, and mode of operation of the various parts of a heel-nailing machine.

With these objects in view a feature of my invention consists in providing a heel-nailing machine with mechanism for driving heel-attaching nails on both sides of the heel during the same interval of time constructed and arranged to drive the nails on each side of the heel successively. By providing such a mechanism for driving the heel-attaching nails the pressure required to drive the nails through the heel and to clench the nails against the clenching-plate upon the inside of the shoe is greatly reduced and at the same time the heel is prevented from being displaced upon the shoe and is firmly pressed into contact with the sole of the shoe on both sides. Broadly considered, this feature of my invention contemplates driving the nails successively either singly or in groups, and it also contemplates driving nails upon opposite sides of the heel either simultaneously or successively.

In the preferred form of my invention the mechanism for driving the nails is constructed and arranged to successively drive groups of the heel-attaching nails containing nails upon each side of the shoe, as when the nails are so driven both sides of the heel are pressed more firmly in contact with the sole of the shoe and the heel is more effectually prevented from being displaced than when the nails are driven successively on opposite sides of the heel.

My invention also consists in providing a heel-nailing machine with means for successively forcing the top lift upon the projecting heel-attaching nails. By applying the top lift in this manner the top lift is forced upon the heads of the nails progressively instead of being forced upon the heads of all the nails simultaneously, and the pressure required to force the top lift into position is materially reduced. While this feature of my invention, broadly considered, contemplates any means for successively forcing the top lift upon the heel-attaching nails, it is preferably embodied in a construction adapted to impart to the top lift a series of sharp quick blows, as I have found that when the top lift is applied in this manner less pressure is required and less strain is put upon the parts supporting the shoe or upon the wooden last than when the top lift is applied by means of a gradually-increasing pressure.

My invention also consists of the devices and combinations of devices hereinafter described and claimed, the advantages of which will be obvious to those skilled in the art.

My invention is intended, primarily, as an improvement on the heel-nailing machine disclosed in the patent to Pope, No. 446,885, dated February 24, 1891; but it is to be understood that, broadly considered, it is not limited to such machine, but may be embodied in any suitable form of heel-nailing machine.

It is also to be understood that, except as specifically defined in the claims, my invention is not limited to any particular construction or arrangement of parts.

The machine disclosed in the patent to Pope comprises a nail-block, a shoe-supporting jack upon one side of the nail-block, and a series of nail-drivers upon the other side of the nail-block, said parts being constructed and arranged to allow the nail-block to be loaded from the side on which the drivers are located. So far as I am advised as to the state of the art I am the first to provide a machine of this type with means for driving the nails successively either singly or in groups.

Certain features of my invention therefore consist in providing a heel-nailing machine of this type with the improved means for driving the nails hereinafter described and claimed, which means, broadly considered, may be arranged to drive the nails in any desired order and is not limited to means arranged to drive nails upon one side of the heel while the nails on the other side are being driven.

Having thus indicated the nature and scope of my invention, I will now proceed to describe the specific embodiment thereof shown in the accompanying drawings, in which—

Figure 10:
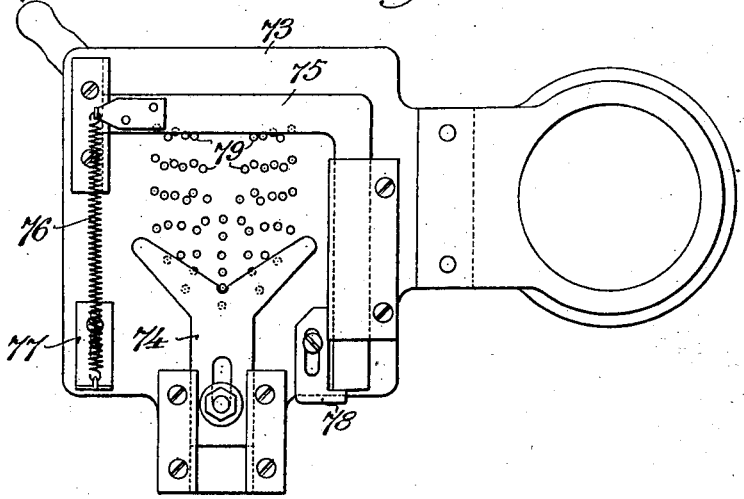
Figure 11:
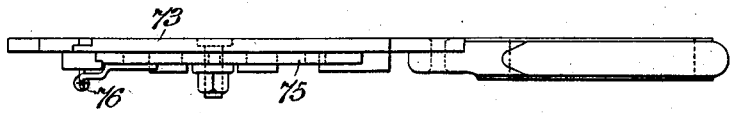

Figure 1 is a view in side elevation of a heel-nailing machine of the same general construction as the machine shown in the patent to Pope, hereinbefore referred to, with the preferred form of my invention applied thereto. Fig. 2 is a plan view of the machine illustrated in Fig. 1. Fig. 3 is a rear end view of the machine. Fig. 4 is a view in side elevation, on an enlarged scale, of a portion of the opposite side of the machine to that shown in Fig. 1. Figs. 5, 6, and 7 are views in side and end elevation and in plan of one of the driver-carriers with its attached drivers. Fig. 8 is an underneath plan view of the top-lift carrier and sectional spanker-plate. Fig. 9 is a sectional view on the line 9 9 of Fig. 8. Fig. 10 is an underneath plan view of the heel-carrier, and Fig. 11 is a view in side elevation thereof.

Referring to the drawings, 1 indicates the main frame of the machine, in the lower portion of which is journaled the driving-shaft 2. Upon the driving-shaft 2 is loosely mounted a balance-wheel 3, provided with an extended hub, upon which the fast and loose belt-pulleys 4 and 5 are mounted. The balance-wheel 3 is clutched to the driving-shaft 2 by means of a single-revolution clutch controlled by a lever 6, connected by a link 7 to a hand-lever 8. Secured to the front end of the shaft 2 is a cam-disk 9, provided with a cam-rib 10, which is engaged on opposite sides by studs or rolls 11 and 12, mounted upon a cross-head secured to the lower end of two vertical rods 13 and 14, mounted to reciprocate in suitable bearings in the frame 1. To the upper end of the rods 13 and 14 a cross-head 15 is secured in which the nail-driver carriers are mounted, as will be hereinafter described.

16 indicates a stationary cross-head supported upon the upper ends of the upper bearings for the rods 13 and 14. This cross-head is provided with a series of holes through which the drivers pass in driving the heel-attaching nails and constitutes a die or nail block.

17 indicates a shoe-supporting jack of any suitable construction, herein shown as constructed to support a wooden last. The jack shown is of old and well-known construction, and a detailed description thereof is considered unnecessary. The jack is mounted to slide horizontally in a vertically-movable support 18 to carry the heel portion of the shoe which has been placed upon the jack beneath the nail-block 16. The vertical movable support 18 is actuated to bring the shoe into contact with the heel supported beneath the die-block 16 in position to receive the heel-attaching nails by mechanism which is illustrated and described in the patent to Pope, hereinbefore referred to, such mechanism comprising a pivoted lever 19, to which a foot-treadle 20 is attached, a connecting-rod 21, a bell-crank 22, a connecting-link 23, and a reciprocating rack-bar 24, meshing with a pinion on a screw-threaded shaft which has a screw-threaded engagement with the support 18.

The operation of the mechanism so far described is as follows: A lasted shoe having been placed on the jack 17, the jack is moved upon the support 18 from the position shown in Fig. 1 to a position in which the heel portion of the shoe is beneath the nail-block 16, the correct position of the heel portion of the shoe with relation to the holes in the nail-block being secured by suitable gages or guides (not shown) which engage the back portion of the shoe. The treadle 20 is then depressed and the support 18 raised to press the heel portion of the sole of the shoe against a heel supported beneath the nail-block 16 by means of a heel-carrier, to be hereinafter described. The hand-lever 8 is then actuated to cause the lever 6 to release the clutch for connecting the balance-wheel 3 to the driving-shaft 2, which makes one complete revolution and stops. During the revolution of the shaft the cross-head 15 is lowered until the lower ends of the nail-drivers are in close proximity to or enter the holes in the die-block 16. The cross-head 15 is held in its lowered position during approximately half of a revolution of the driving-shaft 2 and is then returned to the position indicated in Fig. 1. During the first portion of the revolution of the shaft 2 the support 18 is automatically forced upwardly a short distance to clamp the heel firmly by means of mechanism illustrated and described in the patent to Pope, hereinbefore referred to, such mechanism consisting of collars 25, clamped upon the rods 13 and 14, links 26, lever-arms 27, and cams actuated by the lever-arms.

The nail-driving mechanism which I have illustrated in the drawings comprises a series of nail-driver carriers and means for actuating the nail-driver carriers successively. One of these driver-carriers is illustrated in Figs. 5, 6, and 7 as consisting of a plate 28, to the lower edge of which is secured a wearing-plate 29 to take the thrust of the drivers. To the lower end of the plate 28 is also secured a plate 30, through perforations in which the drivers 31 pass. The plates 28 are mounted side by side in an opening formed in the cross-head 15, the V-shaped edges of the plates being received and guided in vertical V-shaped guideways formed in the side walls of a rectangular frame or cage 32, secured in the opening in the cross-head 15 by means of screws 33. Each of these plates 28 is normally held in its raised position and is returned to said position after being depressed by means of a coiled spring 34, surrounding a rod 35 and having one end attached to the plate and the other bearing against a fixed portion of the cross-head. A shaft 36 is mounted in bearings formed in arms extending upwardly from the cross-head 15, and secured to this shaft are a series of cams 36, corresponding in number to the plates 28. Each of these cams engages a roll 38, journaled in the upper end of one of the plates 28, and the cams are so placed with relation to each other that during a rotation of the shaft they act successively to depress the plates 28.

As has been stated, the cross-head 15 is held in its lowered position during half of a revolution of the driving-shaft 2. While the cross-head is thus held in its lowered position, the shaft 36 is rotated to cause the plates 28 to be depressed successively to force the nail-drivers through the holes in the nail-block and drive the nails. For so rotating the shaft 36 during the half of the revolution of the driving-shaft 2 in which the cross-head 15 is held in its lowered position the machine illustrated in the drawings is provided with mechanism which may be described as follows: To the rear end of the driving-shaft 2 is secured a sprocket-wheel 39, which drives a shaft 40, journaled in bearings in a supplemental frame 41, secured to the main frame through a sprocket-chain 42, and sprocket-wheel 43, secured to the shaft 40. Also mounted in bearings in the frame 41 in line with the shaft 40 is a shaft 44, and connecting the two shafts is a single-revolution clutch 45 of suitable construction, the clutch shown being of the well-known Horton type. To the inner end of the shaft 44 is secured a beveled gear 46, which meshes with a similar gear 47, secured to the lower end of the vertical shaft 48, mounted in bearings in the frame 41. A beveled gear 49 is splined upon the upper end of the shaft 48, so as to rotate therewith and be capable of moving longitudinally thereon, and this gear meshes with a similar gear 50 upon the rear end of shaft 36. The rear end of the shaft 36 is provided with a roll which enters a groove in the hub of gear 49, whereby the gear 49 is moved with the shaft 36 during the reciprocations of the cross-head 15 and retained in mesh with the gear 50.

The above-described construction is such that when the shaft 44 is connected to the shaft 40 by means of the clutch 45, so as to make one revolution, the shaft 36 is caused to make a complete revolution during a half-revolution of the shaft 2. In order to prevent the momentum of the parts from continuing the rotation of the shaft 36 after the shaft 44 is disconnected from the shaft 40, a cam 51 upon the shaft 48 is arranged to actuate the lever 52, to which a brake-shoe 53 is secured, and press the brake-shoe against a collar secured to the shaft 48.

It is necessary for the proper operation of the machine that the clutch 45 be actuated to connect the shafts 40 and 44 at a certain time during the operation of the machine. For so actuating the clutch the machine shown in the drawings is provided with mechanism which may be described as follows: Referring particularly to Figs. 3 and 4, 54 indicates a bell-crank lever pivotally mounted in a bracket 55, secured to the frame 41. To the upper end of the vertical arm of this bell-crank lever is secured a bow-spring 56, which when the bell-crank is in the position indicated in Fig. 3 extends into the path of movement of a projection forming a part of the clutch mechanism 45. Upon the horizontal arm of the bell-crank 54 is pivotally mounted a lever-arm 57, the upper end of which is forked to form two projections 58 and 59. The lower end of the lever-arm is pivotally connected to a lever-arm 60, pivotally mounted upon a stud 61, secured in an arm 62, projecting downwardly from the bracket 55. A coiled spring 63 surrounds the stud 61 and is connected at one end to a collar fixed to the stud and at the other end to the lever-arm 60, the construction being such that the tendency of the spring is to straighten the toggle formed by the lever-arms 57 and 60 and move the bell-crank 54 into the position indicated in Fig. 3. A rock-shaft 64 is mounted in bearings in the side of the main frame 1 and is provided at its forward end (see more particularly Fig. 4) with an arm 65, which is connected by means of a link 66 to the pivot-pin, which connects the link 26 and lever 27 for operating one of the jack-elevating cams hereinbefore referred to. The other end of the lever 64 is also provided with an arm 67, on the free end of which is pivotally mounted a block 68, through which the screw-threaded lower end of a slide 69 passes and is adjustably connected thereto by means of adjusting-nuts 70. The slide 69 extends through an opening in the horizontal arm of the bell-crank 54 and is pressed against the projection 59 of the lever-arm 57 by means of a spring-pressed lever 71, pivoted to the outer end of the horizontal arm of the bell-crank. The side of the slide 69 next to the projection 59 is cut away to form a projection at the upper end of the slide extending over the projection 59.

The above-described construction is such that when the cross-head 15 is lowered by the downward movement of the rods 13 and 14 the shaft 64 is rocked through the links 26 and 66, and the slide 69 is moved downwardly until its projecting upper end contacts with the projection 59 of the lever-arm 57. The continued downward movement of the slide 69 swings the bell-crank 54 upon its pivot and moves the spring 56 from the path of the projection forming a part of the clutch mechanism 45. The downward movement of the slide 69 also swings the lever-arm 57 about its pivot until the projection 58 of the lever-arm is brought into contact with the upper end of the slide 69 and presses the slide backward out of engagement with the projection 59. As soon as the slide 69 is moved out of engagement with the projection 59 the spring 63, acting on the lever-arm 60, returns the lever-arm 57 and the bell-crank lever 54 to the position indicated in Fig. 3, in which position the spring 56 is again in the path of movement of the projection forming part of the clutch mechanism 45. The clutch mechanism 45 is thus actuated to cause the shaft 36, carrying the driver-operating cams 37, to make one revolution when the cross-head 15 has been brought into its lowered position, such revolution being completed before the cross-head is again returned to its upper position.

The machine shown in the drawings is provided with a nail-holder, indicated at 72, (see more particularly Fig. 2,) of the same construction as that illustrated in the patent to Pope, hereinbefore referred to, and which need not be specifically described herein. The machine is also provided with a heel-carrier (illustrated separately in Figs. 10 and 11) and with a top-lift carrier and spanker-plate. (Illustrated separately in Figs. 8 and 9.)

The heel-carrier comprises a frame 73, pivotally mounted upon the upper end of the bearing for the rod 13 beneath the cross-head 16. In guideways on the lower surface of the frame 73 is adjustably mounted a stationary clamping-jaw 74, shaped to engage opposite sides of the rounded rear edge of the heel. Also mounted in a guideway on the lower surface of the frame 73 is an L-shaped clamping-slide 75, which is forced toward the stationary clamping-jaw 74 by means of a coiled spring 76, one end of which is connected to the slide 75 and the other end of which is connected to a plate 77, secured to the frame 73, so as to be capable of adjustment in order to adjust the tension of the spring 76, as clearly shown in Fig. 10. The movement of slide 75 toward the clamping-jaw 74 is limited by an adjustable stop 78 engaging the end of the slide. The frame 73 is provided with a series of holes 79, which when the heel-carrier is in position beneath the nail-block register with the holes in the nail-block.

The top-lift carrier and spanker-plate (illustrated in Figs. 8 and 9) comprise a frame 80, pivotally mounted upon the upper end of the upper bearing for the rod 14 beneath the cross-head 16. This frame is provided with a rectangular opening, in which is movably mounted the spanker-plate 81. The spanker-plate is made up of a series of sections, as shown, which are movable vertically in the opening in the frame 80, independently of each other. Beneath the frame 80 is a plate or frame 82, pivotally mounted between ears projecting laterally from the frame 80. The plate 82 is provided with a rectangular opening of less width than the opening in the frame 80, so that when the plate 82 is pressed upwardly against the frame 80 the sections of the spanker-plate are held in their raised position, as indicated in Fig. 9. The plate 82 is normally held in this position by means of a coiled spring 83, surrounding the pivotal stud upon which the plate is supported and having one end in engagement with the plate 82 and the other end in engagement with the frame 80. A stationary clamping-jaw 84 is adjustably mounted in guideways on the lower surface of the plate 82 and is shaped to engage opposite sides of the rounded rear end of the top lift. Coöperating with this fixed clamping-jaw is an L-shaped clamping-slide 85, one arm of which is mounted to slide in a guideway formed in a plate 86, secured to the plate 82, and the outer end of the other arm of which is guided between the plate 82 and a plate 87 secured thereto. The slide 85 is pressed toward the clamping-jaw 84 by means of a coiled spring 88, one end of which is connected to the free end of one arm of the slide and the other end of which is connected to a plate 89, adjustably secured to the plate 82. The movement of the slide 85 toward the clamping-jaw 84 is limited by an adjustable stop 90, secured to the plate 82 and arranged to engage the end of the slide.

The heel-carrier and the top-lift carrier and spanker-plate are movable from the position indicated in Fig. 2 to a position in which the heel carried by the heel-carrier or the top lift carried by the top-lift carrier is beneath the holes in the nail-block, the inward movements of the carriers beneath the nail-block being limited by suitable adjustable stops. (Not shown.) The outward movement of the carriers is limited by stops 91 upon brackets secured to the ends of the nail-block.

Briefly stated, the operation of the machine illustrated in the drawings and above described is as follows: A heel is placed in the heel-carrier and the carrier is swung into position beneath the nail-block. The nail-loader is then moved to supply the nail-block with nails and is returned to the position indicated in Fig. 2. The jack with the lasted shoe thereon is then moved beneath the nail-block and raised to bring the sole of the shoe in contact with the heel, as has been hereinbefore described. The machine is then thrown into operation by actuating the hand-lever 8. During the first portion of the revolution of the driving-shaft 2 the cross-head 15 is lowered to bring the lower ends of the nail-drivers into proximity to the holes of the nail-block or cause them to slightly enter the holes. The cross-head 15 is held in this position during substantially half a revolution of the driving-shaft 2. As the cross-head 15 nears its lowest position the clutch 45 is actuated through the mechanism hereinbefore described and the shaft 36 is caused to make one complete revolution, such revolution being completed during half a revolution of the driving-shaft 2. The cams 37 act to depress the driver-carriers 28 successively. Each driver-carrier is provided with a plurality of drivers, there being a driver for each hole in the nail-block. The number of nails driven by each driver-plate will depend upon the number of holes in the nail-block which have been supplied with nails. It will be seen, however, that the group of nail-drivers carried by each driver-carrier extends transversely across the heel, and that therefore each driver-carrier is adapted to drive a group of nails containing nails on each side of the heel. In the practical operation of the machine each driver-carrier drives a group of nails containing nails on opposite sides of the heel with the exception of the driver-carrier, which drives the nail at the extreme rear of the heel, and this driver-carrier drives either a single nail or a group of nails, depending on the number and arrangement of nails in the heel. After the shaft 36 completes its revolution the continued rotation of the shaft 2 returns the cross-head 15 to its upper position. If for any reason any of the driver-carriers are not raised by the springs 34 after being depressed by the cams 37, they are positively moved upward with the cross-head 15 by the engagement therewith of a rod 92, secured in the cross-head and extended through slots 93, formed in the driver-carriers 28. After the cross-head 15 is returned to its upper position the machine comes to rest and the jack is lowered to remove the heel from contact with the heel-carrier. The heel-carrier is then returned to the position indicated in Fig. 2, and the top-lift carrier, with a top lift held therein, is swung into position beneath the nail-block. The jack 17 is then again raised to bring the projecting heads of the nails in the heel in contact with the top lift and the machine is again thrown into operation by actuating the hand-lever 8. The cross-head 15 is lowered as before and the shaft 36 rotated to cause the driver-carriers to be successively actuated. The drivers pass through the holes in the nail-block and contact with and depress the sections of the spanker-plate successively, the plate 82 moving with the spanker-plate as the top lift is forced down upon the heads of the nails. The drivers deliver a series of sharp quick blows upon the sections of the spanker-plate, which transmit the blows to the top lift, and thus the top lift is progressively forced into place upon the projecting heads of the nails. After the top lift has thus been attached to the heel the cross-head 15 is returned to its upper position and the machine again comes to rest. The jack 17 is then lowered and the shoe, with the heel attached thereto, removed and another shoe placed thereon and the operations above described repeated.

In the machine illustrated in the drawings and above described it will be seen that the nail-drivers pass completely through the nail-block in order to contact with and depress the sections of the spanker-plate. During successive operations of the machine in driving the heel-attaching nails and in spanking on the top lift the nail-drivers descend to the same distance below the nail-block. It is therefore necessary to provide the machine with means for supporting the heel at some distance below the lower surface of the nail-block during the nail-driving operation in order to prevent the nails from being driven flush with or below the surface of the heel. Such means in the machine shown in the drawings is provided by the heel-carrier 73, the perforated portion of which forms a spacing-plate against which the heel is pressed during the nail-driving operation and by which it is held the desired distance below the lower surface of the nail-block. During the nail-driving operation the drivers enter the holes in the perforated portion of the heel-carrier a greater or less distance, depending upon the height to which the heads of the nails are to project above the surface of the heel. To cause the nail-drivers to be depressed a greater or less distance, as may be desired, the cross-head 15 is adjustably mounted upon the upper ends of the rods 13 and 14 in the manner illustrated and described in the patent to Pope, hereinbefore referred to.

The extent of movement imparted to the sections of the spanker-plate by the nail-drivers will depend upon the initial position of the sections of the spanker-plate with relation to the frame 80. The sections of the spanker-plate are normally held raised by the plate 82, as has been described, and the upward movement of the sections is limited by retaining-plates 94, secured to the upper surface of the frame 80 and extending over the projecting ends of the sections.

If desired, suitable means may be provided for varying the height to which the sections of the spanker-plate are raised by the plate 82, as will be obvious to those skilled in the art without further illustration and description.

Having thus described my invention, I claim as new and desire to secure by Letters Patent of the United States—

1. A heel-nailing machine, having, in combination, a shoe-supporting jack and mechanism for driving heel-attaching nails on both sides of the heel during the same interval of time acting to drive the nails on each side of the heel successively, substantially as described.

2. A heel-nailing machine, having, in combination, a shoe-supporting jack, and means for successively driving groups of the heel-attaching nails, each group containing nails upon each side of the heel, substantially as described.

3. A heel-nailing machine, having, in combination, a shoe-supporting jack, a sectional spanker-plate and means for actuating the sections of the spanker-plate successively to attach the top lift, substantially as described.

4. A heel-nailing machine, having, in combination, a shoe-supporting jack, and means for forcing the top lift upon the projecting heel-attaching nails successively, substantially as described.

5. A heel-nailing machine, having, in combination, a shoe-supporting jack, a series of driver-carriers, drivers carried thereby arranged to drive nails upon opposite sides of the heel simultaneously and means for actuating the driver-carriers successively, substantially as described.

6. A heel-nailing machine, having, in combination, a shoe-supporting jack, a nail-block, a series of driver-carriers, drivers carried thereby, means for relatively actuating the nail-driver carriers and nail-block to bring the drivers in close proximity to the holes in the nail-block, and means for successively actuating the driver-carriers to drive the nails, substantially as described.

7. A heel-nailing machine, having, in combination, a shoe-supporting jack, a stationary nail-block, a series of driver-carriers, drivers carried thereby, means for actuating the driver-carriers to bring the drivers in close proximity to the holes in the nail-block, and means for successively actuating the driver-carriers to drive the nails, substantially as described.

8. A heel-nailing machine, having, in combination, a shoe-supporting jack, a series of driver-carriers, drivers carried thereby, a sectional spanker-plate movable into a position between the drivers and a shoe supported upon the jack, and means for successively actuating the driver-carriers to actuate the sections of the spanker-plate successively to attach the top lift, substantially as described.

9. In a heel-nailing machine, a top-lift carrier having in combination a frame, a spanker-plate movably mounted thereon, and a plate mounted to move on said frame with the spanker-plate provided with means for holding a top lift, substantially as described.

10. A heel-nailing machine, having, in combination, a shoe-supporting jack, and means for imparting to the top lift a series of sharp quick blows to force the top lift upon the heel-attaching nails successively, substantially as described.

11. A heel-nailing machine, having, in combination, a shoe-supporting jack, a nail-block, a heel-carrier provided with means for holding a heel and with a perforated separator-plate for supporting the heel at a distance from the surface of the nail-block, a spanker-plate, nail-drivers, and means for actuating the nail-drivers to drive the heel-attaching nails and to actuate the spanker-plate to attach the top lift, substantially as described.

12. A heel-nailing machine, having, in combination, a nail-block, a shoe-supporting jack upon one side of the block, a series of drivers upon the other side of the block, said block and drivers being relatively movable to allow the block to be loaded from the side on which the drivers are located and means for actuating the drivers to drive the nails successively, substantially as described.

13. A heel-nailing machine, having, in combination, a shoe-supporting jack, a series of driver-carriers, drivers carried thereby, a sectional spanker-plate movable into a position between the drivers and a shoe supported upon the jack, means for moving the driver-carriers toward the spanker-plate and means for successively actuating the driver-carriers to actuate the sections of the spanker-plate successively to attach the top lift, substantially as described.

In testimony whereof I affix my signature in presence of two witnesses.

HENRY BRIGGS.

Witnesses:
FRED O. FISH,
ALFRED H. HILDRETH.